(12) United States Patent
Weizman et al.

(10) Patent No.: US 11,368,473 B2
(45) Date of Patent: Jun. 21, 2022

(54) INTERFACE THREAT ASSESSMENT IN MULTI-CLUSTER SYSTEM

(71) Applicant: Microsoft Technology Licensing, LLC, Redmond, WA (US)

(72) Inventors: Josef Weizman, Haifa (IL); Ram Haim Pliskin, Rishon Lezion (IL); Dotan Patrich, Hertzliya Pituach (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 95 days.

(21) Appl. No.: 17/027,272

(22) Filed: Sep. 21, 2020

(65) Prior Publication Data

US 2022/0094700 A1    Mar. 24, 2022

(51) Int. Cl.
*H04L 9/40* (2022.01)

(52) U.S. Cl.
CPC ...... *H04L 63/1416* (2013.01); *H04L 63/0876* (2013.01); *H04L 63/1425* (2013.01); *H04L 63/1433* (2013.01); *H04L 63/20* (2013.01)

(58) Field of Classification Search
CPC ............ H04L 63/1416; H04L 63/0876; H04L 63/1425; H04L 63/1433; H04L 63/20
USPC ........................................................ 726/22
See application file for complete search history.

(56) References Cited

U.S. PATENT DOCUMENTS

| | | | |
|---|---|---|---|
| 9,762,603 B2 * | 9/2017 | Grondin | G06F 21/577 |
| 10,754,958 B1 * | 8/2020 | Sidagni | G06F 21/552 |
| 10,885,058 B2 * | 1/2021 | Andritsos | G06F 16/358 |
| 2006/0212556 A1 * | 9/2006 | Yacoby | H04L 41/0893 709/224 |
| 2011/0154498 A1 * | 6/2011 | Fissel | H04L 63/1433 715/764 |
| 2011/0288962 A1 * | 11/2011 | Rankin, Jr. | G06F 16/24573 726/28 |
| 2012/0096392 A1 * | 4/2012 | Ording | G06F 9/451 715/783 |
| 2014/0283085 A1 | 9/2014 | Maestas | |
| 2014/0289847 A1 * | 9/2014 | Hughes | H04L 43/028 726/22 |

(Continued)

FOREIGN PATENT DOCUMENTS

WO    0203178 A2    1/2002

OTHER PUBLICATIONS

"International Search Report and Written Opinion Issued in PCT Application No. PCT/US21/036066", dated Sep. 24, 2021, 11 Pages.

(Continued)

*Primary Examiner* — Teshome Hailu
(74) *Attorney, Agent, or Firm* — Workman Nydegger

(57) ABSTRACT

The automated estimation that an interface service has been misconfigured. Sensitive interface services are first identified based on common characteristics, and those characteristics are associated with sensitivity based on behavior across multiple clusters. Thereafter, the threat assessment estimates that a particular interface service is misconfigured if the particular interface service has these same common characteristics, is accessible from outside the cluster, and does not require authentication. Cluster administrators can therefore be more fully and timely advised when a misconfiguration of an interface service subjects their cluster to undue security risks.

20 Claims, 6 Drawing Sheets

(56) References Cited

U.S. PATENT DOCUMENTS

| | | | | |
|---|---|---|---|---|
| 2015/0326601 A1* | 11/2015 | Grondin | ............... | G06F 21/577 |
| | | | | 726/25 |
| 2017/0223026 A1* | 8/2017 | Amiri | .................... | H04L 63/10 |
| 2017/0223057 A1* | 8/2017 | Amiri | ................... | H04L 67/306 |
| 2020/0279491 A1* | 9/2020 | Elisha | .................... | G06F 16/29 |

OTHER PUBLICATIONS

Torkura, et al., "Towards Cloud-Aware Vulnerability Assessments", In Proceedings of the 11th International Conference on Signal-Image Technology & Internet-Based Systems, Nov. 23, 2015, pp. 746-751.

"Labels and Selectors", Retrieved from: https://web.archive.org/web/20200901011542/https://kubernetes.io/docs/concepts/overview/working-with-objects/labels/, Sep. 1, 2020, 5 Pages.

"Service", Retrieved from: https://web.archive.org/web/20200901012535/https://kubernetes.io/docs/concepts/services-networking/service/, Sep. 1, 2020, 19 Pages.

Osborne, Charlie, "Tesla cloud systems exploited by hackers to mine cryptocurrency", Retrieved from: https://www.zdnet.com/article/tesla-systems-used-by-hackers-to-mine-cryptocurrency/, Feb. 20, 2018, 10 Pages.

Weizman, Yossi, "Detect large-scale cryptocurrency mining attack against Kubernetes clusters", Retrieved from: https://azure.microsoft.com/en-us/blog/detect-largescale-cryptocurrency-mining-attack-against-kubernetes-clusters/, Apr. 8, 2020, 8 Pages.

Weizman, Yossi, "Misconfigured Kubeflow workloads are a security risk", Retrieved from: https://www.microsoft.com/security/blog/2020/06/10/misconfigured-kubeflow-workloads-are-a-security-risk/, Jun. 10, 2020, 15 Pages.

Weizman, Yossi, "Threat matrix for Kubernetes", Retrieved from: https://www.microsoft.com/security/blog/2020/04/02/attack-matrix-kubernetes/, Apr. 2, 2020, 23 Pages.

* cited by examiner

INTERFACE THREAT ASSESSMENT IN MULTI-CLUSTER SYSTEM

BACKGROUND

A computer cluster is a set connected computers that work together so that it can be viewed as a single entity. For example, a cluster can run a workload. The connected computers (also sometimes called "nodes") can be physical computers or virtual machines. In many cases, there is a trust boundary between clusters. As an example, a public cloud may run many clusters belonging to various customers. An agent of the customer (e.g., a network administrator) can configure their respective clusters. However, if access to the respective cluster is misconfigured, a security breach could result.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The principles described herein relate to automatically performing threat assessment in a multi-cluster system, such as a public cloud. The threat assessment automatically detects interface services that are externally exposed with insufficient protection to outside of the cluster or even to the Internet. The multi-cluster system includes a plurality of clusters of machine nodes, each cluster running one or more applications, and each application having an interface service that exposes the corresponding application as a network service.

A threat assessment component first identifies one or more characteristics of interface services that are indicative of a sensitive interface service. Such might include identifying a group of interface services that have one or more common characteristics, and then identifying the group of interface services as sensitive based on an amount (e.g. a percentage) of clusters that permit the interface services to be connected from outside the respective cluster. If there is a lower percentage of clusters that permit such external access, this would be more indicative of the interface services being more highly sensitive, since the behavior of the clusters in restricting access implies greater sensitivity.

For each of at least some of the plurality of interface services within the multi-cluster system, the threat assessment component estimates that a corresponding interface service within a corresponding cluster is misconfigured so as to be improperly connectable external to the corresponding cluster. It does so in response to the following determinations: 1) determining that the corresponding interface service also has the one or more common characteristics (thereby implying that the interface service is likely sensitive like the other interface services that fewer clusters grant external access to); 2) that the corresponding interface service is connectable outside the corresponding cluster; and 3) that a corresponding application that the corresponding interface service exposes as a network service does not require authentication. If the determinations are made, this means that the interface service is sensitive, and is accessible external to the cluster without using authentication. In this case, the threat assessment component might send a notification to a cluster management component allowing a network administrator for the cluster to take corrective action.

Accordingly, the principles described herein permit for the automated estimation that an interface service has been misconfigured. Sensitive interface services are first identified based on common characteristics, and those characteristics are associated with sensitivity based on behavior across multiple clusters. Thereafter, the threat assessment estimates that a particular interface service is misconfigured if the particular interface service has these same common characteristics, is accessible from outside the cluster, and does not require authentication. Cluster administrators can therefore be more fully and timely advised when a misconfiguration of an interface service subjects their cluster to undue security risks.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

The principles described herein relate to automatically performing threat assessment in a multi-cluster system, such as a public cloud. The threat assessment automatically detects interface services that are externally exposed with insufficient protection to outside of the cluster or even to the Internet. The multi-cluster system includes a plurality of clusters of machine nodes, each cluster running one or more applications, and each application having an interface service that exposes the corresponding application as a network service.

A threat assessment component first identifies one or more characteristics of interface services that are indicative of a sensitive interface service. Such might include identifying a group of interface services that have one or more common characteristics, and then identifying the group of interface services as sensitive based on an amount (e.g. a percentage) of clusters that permit the interface services to be connected from outside the respective cluster. If there is a lower percentage of clusters that permit such external access, this would be more indicative of the interface services being more highly sensitive, since the behavior of the clusters in restricting access implies greater sensitivity.

For each of at least some of the plurality of interface services within the multi-cluster system, the threat assessment component estimates that a corresponding interface service within a corresponding cluster is misconfigured so as to be improperly connectable external to the corresponding cluster. It does so in response to the following determinations: 1) determining that the corresponding interface service also has the one or more common characteristics (thereby implying that the interface service is likely sensitive like the other interface services that fewer clusters grant external access to); 2) that the corresponding interface service is connectable outside the corresponding cluster; and 3) that a corresponding application that the corresponding interface service exposes as a network service does not require authentication. If the determinations are made, this means that the interface service is sensitive, and is accessible external to the cluster without using authentication. In this case, the threat assessment component might send a notification to a cluster management component allowing a network administrator for the cluster to take corrective action.

Figure 1:
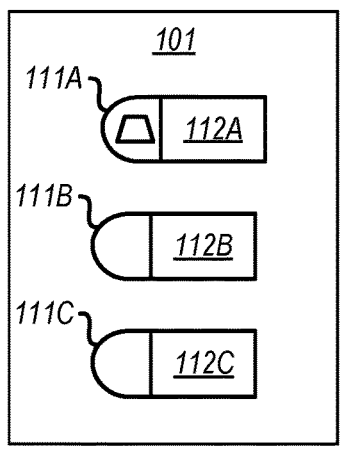
FIG. 1 illustrates a multiple cluster environment in which the principles described herein may be practiced.
Figure 1:
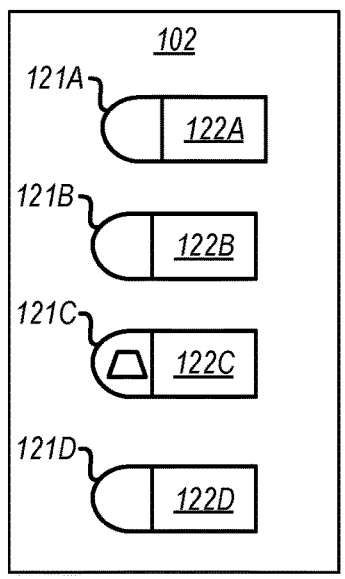
Figure 1:
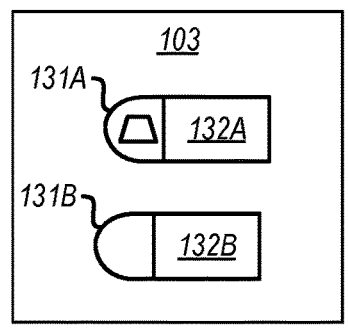
Figure 1:
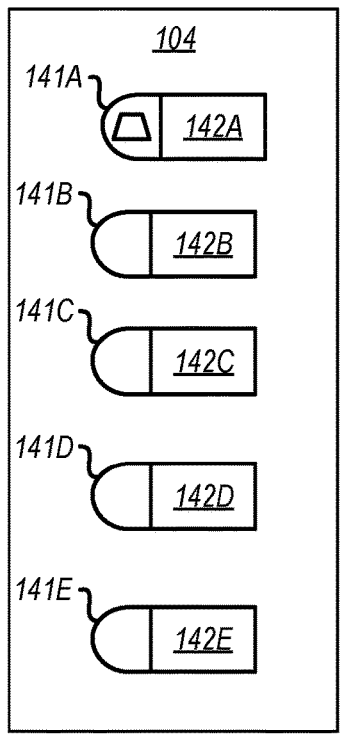
Figure 1:
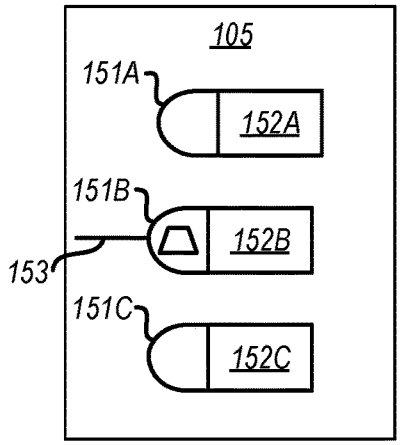

FIG. 1 illustrates a multiple cluster environment 100 in which the principles described herein may be practiced. A "cluster" is a group of connected computing systems that operate together to perform tasks. In a cluster, each computing system is referred to as a "node". A node may be a physical computing system or a virtual machine. An example of a multiple cluster environment 100 is a cloud computing environment. In a private cloud environment, all clusters may perhaps be in a common sphere of trust. In a public cloud environment, clusters may belong to different customers of the public cloud provider. Each customer may operate one or more clusters within the multiple cluster environment.

In this illustrated cluster environment 100, there are only five clusters shown including clusters 101 through 105. However, the ellipsis 106 represents that there may be any number of clusters within the multiple cluster environment 100. The ellipsis 106 also represents that the number of clusters may change over time as clusters are removed from the multiple cluster environment 100, and as clusters are added to the multiple cluster environment 100. The principles described herein are not limited to the number of clusters operating in the multiple cluster environment 100. As an example, a cloud computing environment might run on the order of thousands or millions of clusters or even more.

Each cluster runs one or more applications. Each application has a corresponding interface service that exposes the application as a network service. In FIG. 1, each application is represented as a horizontally extending rectangle, and the corresponding interface service is represented as an elongated semi-circle attached at its flat side to the right side of the rectangle. Of course, the clusters can run any arbitrary number of applications, and the number of applications shown as running by each cluster 101 through 105 in FIG. 1 is just for illustrative purposes only.

As an example only, the cluster 101 is illustrated as running three applications 112A, 112B and 112C. Interface service 111A exposes the application 112A as a network service, interface service 111B exposes application 112B as a network service, and interface service 111C exposes application 112C as a network service. Likewise, cluster 102 is illustrated as running four applications 122A through 122D which are each exposed as network services using respective interface services 121A through 121D. Similarly, cluster 103 is illustrated as running two applications 132A and 132B which are each exposed as network services using respective interface services 131A and 131B. Continuing, cluster 104 is illustrated as running five applications 142A through 142E which are each exposed as network services using respective interface services 141A through 141E. Finally in this example, cluster 105 is illustrated as running three applications 152A through 152C which are each exposed as network services using respective interface services 151A through 151C.

The multiple cluster environment 100 also includes a threat assessment component 160 that performs the threat assessments described herein. The threat assessment component 160 may be structured as described below for the executable component 706 of FIG. 7. The threat assessment component 160 also has access to a log 170 which records some events that occur within the multiple cluster environment 100, such as interface service creation and reconfiguration events that will be described further below. The log 170 may record events from any of the clusters 101 through 105.

Figure 2:
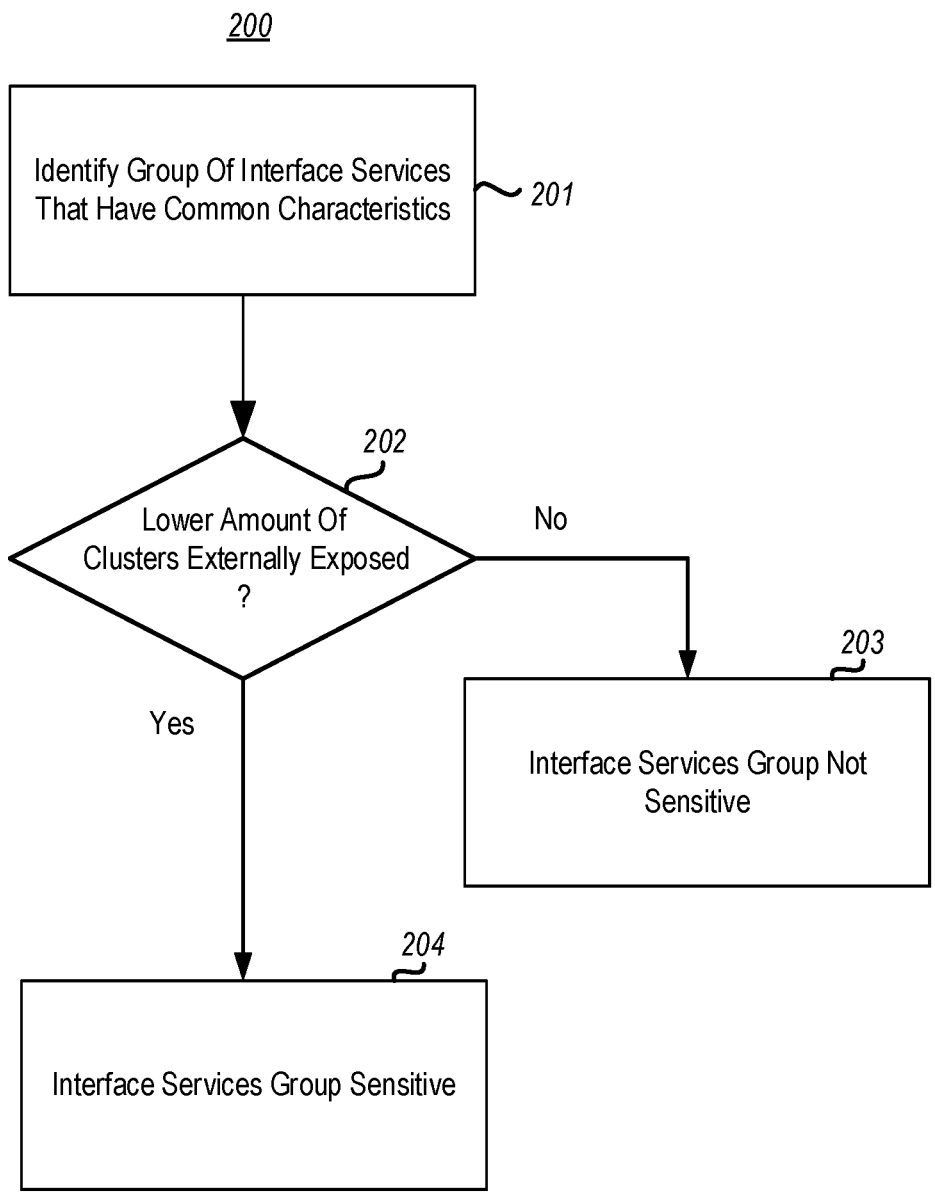
FIG. 2 illustrates a flowchart of a method for automatically estimating whether interface services having one or more characteristics are sensitive, in accordance with the principles described herein.

FIG. 2 illustrates a flowchart of a method 200 for automatically estimating whether interface services having one or more characteristics are sensitive, in accordance with the principles described herein. The method 200 is performed in a multi-cluster system that includes a plurality of clusters of machine nodes, each cluster running one or more applications, and each application having an interface service that exposes the corresponding application as a network service. As an example, the method 200 may be performed by the multi-cluster thread assessment component 160 within the multiple cluster environment 100 of FIG. 1, and this example will commonly be referred to hereinafter.

The method 200 may be performed for each of multiple groups of interface services to determine whether or not each group is sensitive. Sensitive interface services are those services that are allowed to perform sensitive actions in the cluster and on the underlying nodes. As examples, such actions can be the ability to run code on the container and/or underlying node, deploy new containers in the cluster, list secrets from the cluster, gather information about the running workload, and so forth. These are just examples. Sensitive actions could include any function that one external to the cluster should not be able to perform without proper authentication.

The method 200 includes identifying a group of interface services that have one or more common characteristics (act 201). As examples, the one or more common characteristics could include an interface service type. For instance, if the multi-cluster system 100 was a Kubernetes system, the interface service type might be the LoadBalancer service type. The one or more common characteristics could also include similar names of the interface service. A name similarity algorithm could be used to combine similar interface service names.

Figure 3:
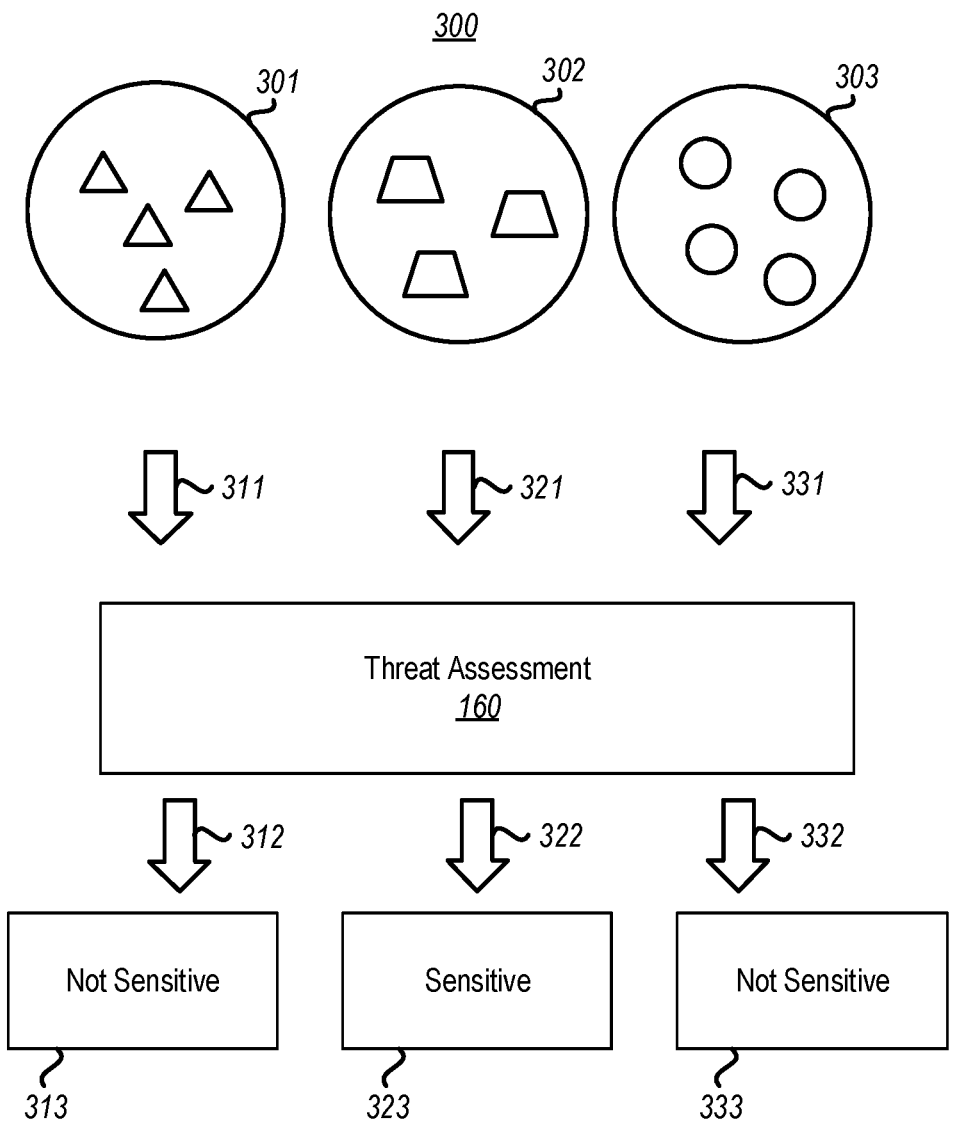
FIG. 3 illustrates an example flow in which the method of FIG. 2 is performed three times in order to make determinations as to whether or not different sets of common characteristics are associated with sensitivity.

FIG. 3 illustrates an example flow 300 in which the method 200 is performed three times. The act 201 is performed one time in one instance of the method 200 to identify a first group 301 having common characteristic(s) (as represented by the constituent interface services being illustrated as triangles). The act 201 is performed one time in another instance of the method 200 to identify a second group 302 having common characteristic(s) (as represented by the constituent interface services being illustrated as trapezoids). As an example, the interface services 111A, 121C, 131A, 141A and 151B of FIG. 1 could have the characteristic(s) associated with this second group 302 is symbolized by each being illustrated as also including a trapezoid. The act 201 is performed one time in yet another instance of the method 200 to identify a third group 303 having common characteristic(s) (as represented by the constituent interface services being illustrated as circles).

The threat assessment component 160 receives the characteristic(s) for each of these groups 301, 302 and 303 as represented by respective arrows 311, 321 and 331. The threat assessment component 160 then determines whether or not the amount of clusters that permit external access to the interface services of that group are low (e.g., below a predetermined percentage of the clusters). As an example, if only a smaller number of clusters (e.g., 5 percent) permit entities outside of the cluster to use the cluster, then interface services of that group (or in other words having the associated characteristic(s)) are considered sensitive.

Consider the interface services of FIG. 1 that belong to the second group 302 (illustrated as containing a trapezoid). One cluster 105 exposes (as represented by line 153) the interface service 151B of the second group 302 outside of the cluster 105. However, clusters 101 through 104 each do not expose their respective interface service of that second group 302 outside of their respective cluster. Accordingly, here, but a single cluster exposes interface services of the second group 302 outside of the respective cluster. In the example, this causes the threat assessment component 160 to estimate that interface services having the common characteristic(s) of the second group 302 are to be consider sensitive, since the clusters themselves are behaving that way. On the other hand, if most clusters exposed interface services having particular common characteristic(s) external to the cluster (e.g., to other clusters or to the Internet), then the threat assessment component 160 would determine that the particular characteristic(s) is not indicative of a sensitive interface service, since clusters are behaving like they are not sensitive.

Referring again to FIG. 3, suppose that the threat assessment component 160 determines that interface services having the characteristic(s) associated with the first group 301 are not sensitive (act 203) based on the amount of clusters permitting external access to such interface services being higher ("No" in decision block 202). Referring to FIG. 1, the threat assessment component 160 may determine which clusters permit external access to such interface services by examining the log 170. The threat assessment component would then determine (as represented by arrow 312 and decision 313) that interface services having those characteristic(s) are not sensitive.

Continuing the example of FIG. 3, suppose also that the threat assessment component 160 determines that interface services having the characteristic(s) associated with the second group 302 are sensitive (act 204 of FIG. 2) based on the relatively smaller amount of clusters permitting external access to such interface services ("Yes" in decision block 202 of FIG. 2). The threat assessment component 202 would then determine (as represented by arrow 322 and decision 323) that interface services having those characteristic(s) are sensitive.

Lastly, suppose that the threat assessment component 160 determines that interface services having the characteristic(s) associated with the third group 303 are not sensitive (act 203) based on the amount of clusters permitting external access to such interface services being higher ("No" in decision block 202). The threat assessment component would then determine (as represented by arrow 332 and decision 333) that interface services having those characteristic(s) are not sensitive.

Thus, the method 200 may be used to categorize characteristic(s) of interface services with estimated sensitivity. This categorization may be done well in advance of making an estimation of whether any particular interface service has been misconfigured. At one extreme, perhaps the categorization of interface characteristic(s) with sensitivity of the corresponding service is done only once. Or perhaps, the categorization is done periodically in case there has been a change in cluster behavior towards interface services having particular characteristic(s). Or perhaps, the categorization is repeated over time in order to obtain better estimations of mappings between interface services and sensitivity. Customers behavior may also be considered. As an example, if customer feedback shows that characteristic(s) are less likely associated with sensitivity, that feedback can be considered in the sensitivity estimation.

Figure 4:
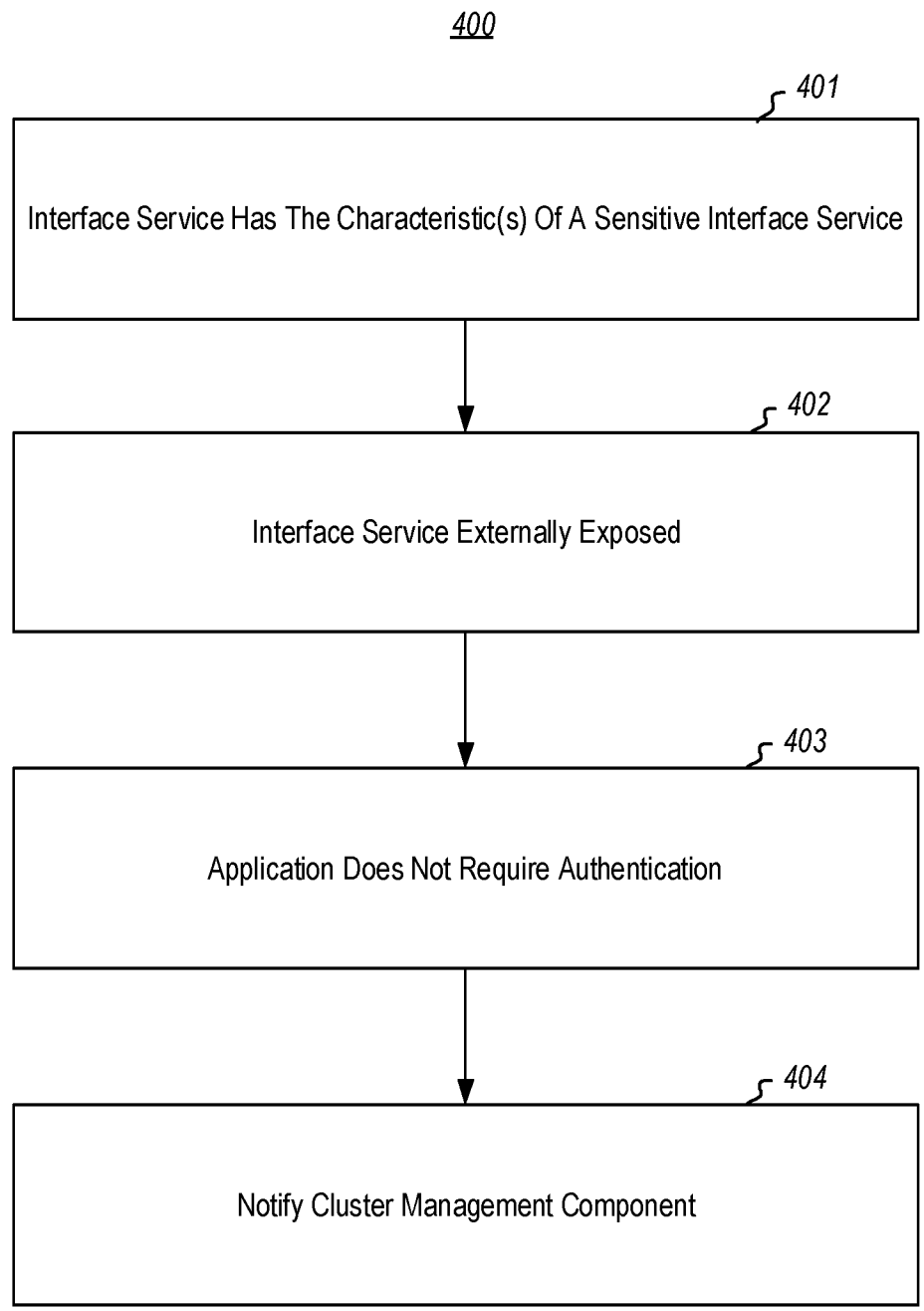
FIG. 4 illustrates a flowchart of a method for automatically detecting or estimating interface services that are externally exposed with insufficient protection, in accordance with the principles described herein.

FIG. 4 illustrates a flowchart of a method 400 for automatically detecting or estimating interface services that are externally exposed with insufficient protection. This method 400 may be performed perhaps with higher frequency, even as often as every time an interface service is created or reconfigured. Specifically, the method 400 estimates whether an interface service of a cluster is misconfigured so as to be improperly connectable external to the corresponding cluster. The method 400 may be performed for any number of interface services, and may be performed for interface services of any number of clusters.

The method 400 includes having the threat assessment component determine that the corresponding interface service also has the one or more common characteristics that the threat assessment component previously categorized as being associated with a group of sensitive interface services (act 401). As an example, the threat assessment component might determine that a particular interface service has the characteristic(s) associated with the second group 302, and thus also determines that the particular interface service is sensitive. If the threat assessment component is not sensitive, then the method 400 can stop without reaching an estimation that the interface service has been improperly configured.

Figure 5:
FIG. 5 illustrates an example of a creation or reconfiguration event, which includes an Internet Protocol (IP) address and a network port.

The threat assessment component also determines whether or not the particular interface service is connectable outside of the corresponding cluster. In one example, this determination is made by examining a log (e.g., log 170) that contains a creation event or reconfiguration event for the particular interface service. FIG. 5 illustrates an example of such an event 500, which includes an Internet Protocol (IP) address 501 and a network port 502. The threat assessment component determines from the recorded IP address 501 and the recorded network port 502 within the creation event 501 whether the particular interface service is accessible outside of the corresponding cluster. If the interface service is not connectable outside of the cluster, then again, the method 400 can stop without reaching an estimation that the interface service has been improperly configured. However, if the threat assessment component determines that the particular interface service is connectable outside of the corresponding cluster (act 402), the analysis continues.

Figure 6:
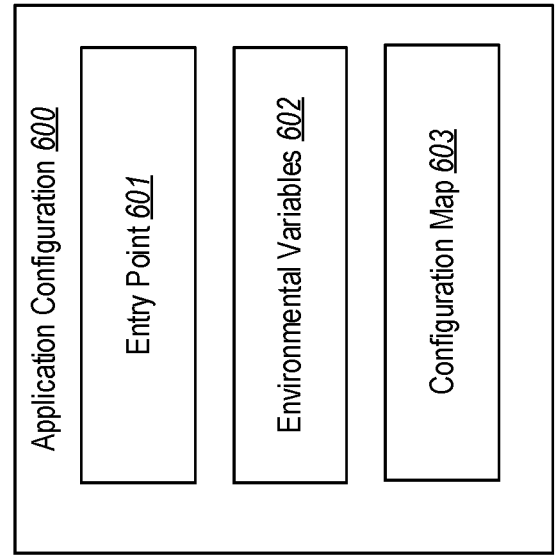
FIG. 6 illustrates an example of the application configuration which includes an entry point, environmental variables and a configuration map.

The threat assessment component also determines whether or not the application that the corresponding interface service exposes as a network service requires authentication (act 403). In one example, this determination is made by checking configuration of the particular application. For instance, in FIG. 1, if the threat assessment component 160 was estimating whether or not the interface service 151B is misconfigured, the threat assessment component 160 would look at the application configuration of the corresponding application 152B. FIG. 6 illustrates an example of the application configuration 600 which includes an entry point 601, environmental variables 602 and a configuration map 603. If authentication is applied, an indication should appear in at least one of the application's entry-point, the application's environment variables, and a configuration map in the application's namespace and response code.

If the application requires authentication, then again, the method 400 can stop without reaching an estimation that the interface service has been improperly configured. However, if the threat assessment component determines that the application does not require authentication (act 403), the threat assessment component estimates that the particular interface service is misconfigured, and sends a notification of the estimation to a cluster management component of a particular cluster within which the particular interface service operates (act 404). For instance, suppose that the application 152C is a cluster management component run by a cluster administrator of the cluster 105. If the threat assessment component 160 estimates that the interface service 151B is misconfigured, the threat assessment component 160 sends an electronic notification of the estimation to the application 152C.

Accordingly, the principles described herein permit for the automated estimation that an interface service has been misconfigured. Sensitive interface services are first identified based on common characteristics, and those characteristics are associated sensitivity based on behavior across multiple clusters. Thereafter, the threat assessment estimates that a particular interface service is misconfigured if the particular interface service has these same common characteristics, is accessible from outside the cluster, and does not require authentication. Cluster administrators can therefore be more fully and timely advised when a misconfiguration of an interface service subjects their cluster to undue security risks.

Because the principles described herein are performed in the context of a computing system, some introductory discussion of a computing system will be described with respect to FIG. 7. Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 7:
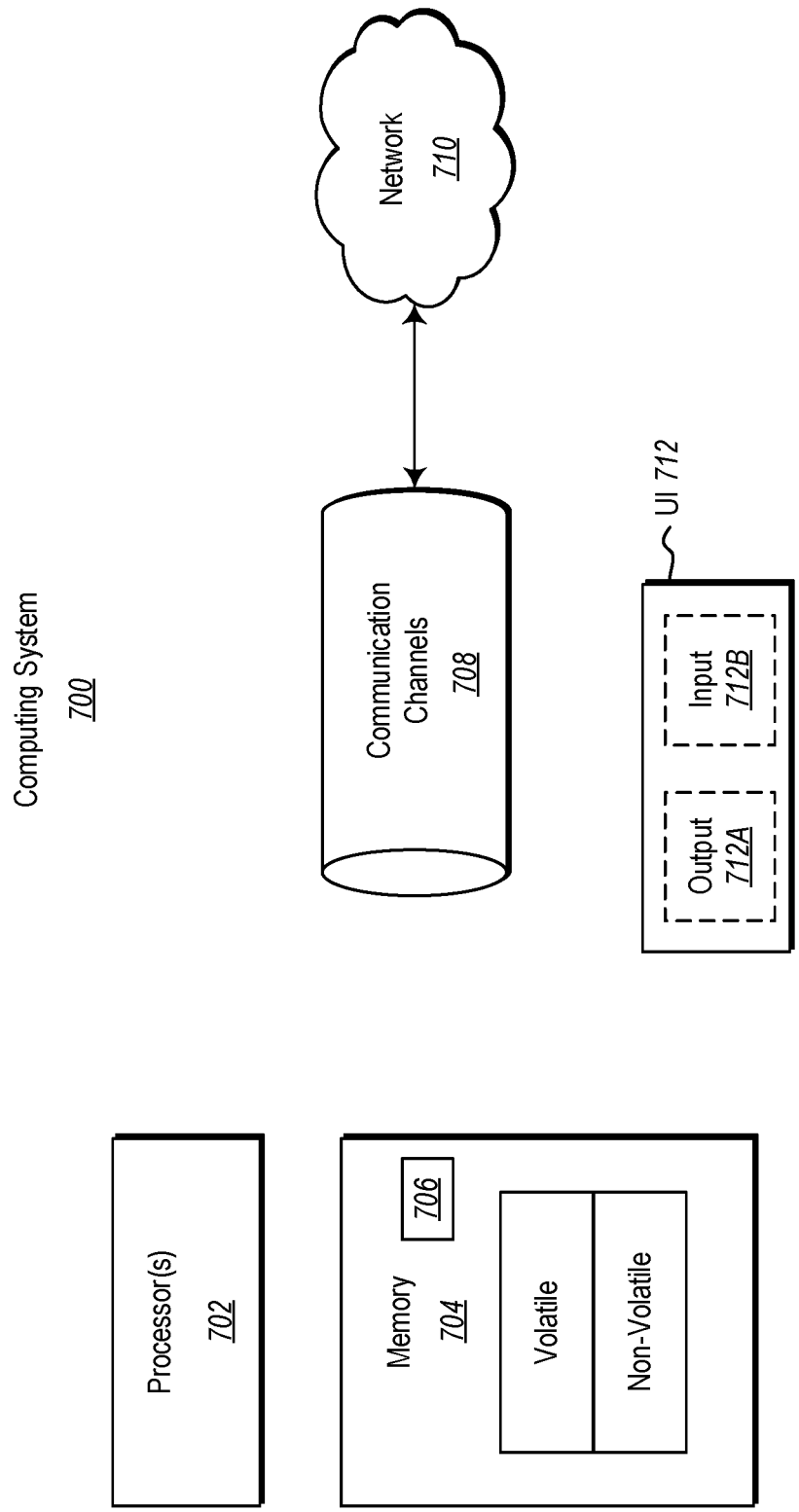
FIG. 7 illustrates an example computing system in which the principles described herein may be employed.

As illustrated in FIG. 7, in its most basic configuration, a computing system 700 includes at least one hardware processing unit 702 and memory 704. The processing unit 702 includes a general-purpose processor. Although not required, the processing unit 702 may also include a field programmable gate array (FPGA), an application specific integrated circuit (ASIC), or any other specialized circuit. In one embodiment, the memory 704 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 700 also has thereon multiple structures often referred to as an "executable component". For instance, the memory 704 of the computing system 700 is illustrated as including executable component 706. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 704 of the computing system 700. Computing system 700 may also contain communication channels 708 that allow the computing system 700 to communicate with other computing systems over, for example, network 710.

While not all computing systems require a user interface, in some embodiments, the computing system 700 includes a user interface system 712 for use in interfacing with a user. The user interface system 712 may include output mechanisms 712A as well as input mechanisms 712B. The principles described herein are not limited to the precise output mechanisms 712A or input mechanisms 712B as such will depend on the nature of the device. However, output mechanisms 712A might include, for instance, speakers, displays, tactile output, virtual or augmented reality, holograms and so forth. Examples of input mechanisms 712B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RANI within a network interface module (e.g., a "MC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A computing system for performing threat assessment by detecting interface services that are externally exposed with insufficient protection, the computing system comprising:
   one or more processors; and
   one or more memory having thereon computer-executable instructions that are structured such that, if executed by the one or more processors, the computing system is configured to:
   identifying a group of interface services that have one or more common characteristics, the group of interface services being in a multi-cluster system that includes a plurality of clusters of machine nodes, each cluster running one or more applications, and each application including an interface service that exposes the corresponding application as a network service;
   identifying the group of interface services as sensitive based on an amount of plurality the clusters that permit the interface services to be connected from outside the respective cluster;
   for each of at least some of the plurality of interface services within the multi-cluster system, estimating that a corresponding interface service within a corresponding cluster is misconfigured so as to be improperly connectable external to the corresponding cluster in response to the following determinations:
      determining that the corresponding interface service also has the one or more common characteristics;
      determining that the corresponding interface service is connectable outside the corresponding cluster; and
      determining that a corresponding application that the corresponding interface service exposes as a network service does not require authentication.

2. The computing system in accordance with claim 1, the computer-executable instructions being further structured such that, if executed by the one or more processors, the computing system is configured to performed the estimation for interface services of multiple clusters of the plurality of clusters in the multi-cluster system.

3. The computing system in accordance with claim 1, the computer-executable instructions being further structured such that, if executed by the one or more processors, the computing system is configured to perform the following in response to estimating that a particular interface service of the at least some of the plurality of interface services is misconfigured:
   sending a notification of the estimation to a cluster management component of a particular cluster within which the particular interface service operates.

4. The computing system in accordance with claim 1, the computer-executable instructions being further structured such that, if executed by the one or more processors, the estimation is performed for at least one of the plurality of interface services in response to a creation of the interface service.

5. The computing system in accordance with claim 1, the computer-executable instructions being further structured such that, if executed by the one or more processors, the estimation is performed for at least one of the plurality of interface services in response to a re-configuration of the interface service.

6. The computing system in accordance with claim 1, the computer-executable instructions being further structured such that, if executed by the one or more processors, the determination that the particular interface service is connectable outside the corresponding cluster comprising:
   examining a log that contains a creation event for the particular interface service, and determining from a recorded Internet Protocol (IP) address and a recorded network port within the creation event that the particular service is accessible outside of the corresponding cluster.

7. The computing system in accordance with claim 1, the computer-executable instructions being further structured such that, if executed by the one or more processors, the determination that a particular application that a particular interface service exposes a network service does not require authentication comprises checking configuration of the particular application.

8. The computing system in accordance with claim 1, the one or more common characteristics including an interface service type and a similarly of interface service name.

9. A method performed by a multi-cluster system threat assessment component for automatically detecting interface services that are externally exposed with insufficient protection, the method comprising:
   identifying a group of interface services that have one or more common characteristics;
   identifying the group of interface services as sensitive based on an amount of plurality the clusters that permit the interface services to be connected from outside the respective cluster, the group of interface services being in a multi-cluster system that includes a plurality of clusters of machine nodes, each cluster running one or more applications, and each application including an interface service that exposes the corresponding application as a network service;
   for each of at least some of the plurality of interface services within the multi-cluster system, estimating that a corresponding interface service within a corresponding cluster is misconfigured so as to be improperly connectable external to the corresponding cluster in response to the following determinations:
      determining that the corresponding interface service also has the one or more common characteristics;
      determining that the corresponding interface service is connectable outside the corresponding cluster; and
      determining that a corresponding application that the corresponding interface service exposes as a network service does not require authentication.

10. The method in accordance with claim 9, the estimation being performed for interface services of multiple clusters of the plurality of clusters in the multi-cluster system.

11. The method in accordance with claim 9, the method further comprising the following in response to estimating that a particular interface service of the at least some of the plurality of interface services is misconfigured:
an act of sending a notification of the estimation to a cluster management component of a particular cluster within which the particular interface service operates.

12. The method in accordance with claim 9, wherein for a particular interface service at least some of the plurality of services, the estimation is performed in response to a creation of the particular interface service.

13. The method in accordance with claim 12, the determining that the particular interface service is connectable outside the corresponding cluster comprising:
examining a log that contains a creation event for the particular interface service, and determining from a recorded Internet Protocol (IP) address and a recorded network port within the creation event that the particular service is accessible outside of the corresponding cluster.

14. The method in accordance with claim 12, the determining that the particular application that the particular interface service exposes a network service does not require authentication comprises: checking configuration of the particular application.

15. The method in accordance with claim 9, wherein for a particular interface service at least some of the plurality of services, the estimation is performed in response to a reconfiguration of the particular interface service.

16. The method in accordance with claim 15, the determining that the particular interface service is connectable outside the corresponding cluster comprising:
examining a log that contains a reconfiguration event for the particular interface service, and determining from a recorded Internet Protocol (IP) address and a recorded network port within the reconfiguration event that the particular service is accessible outside of the corresponding cluster.

17. The method in accordance with claim 9, the one or more common characteristics including an interface service type.

18. The method in accordance with claim 9, the one or more common characteristics including a similarly of interface service name.

19. The method in accordance with claim 9, the identifying of the group of interface services as sensitive being based on a percentage of the plurality of clusters that permit the interface services to be connected from outside the respective cluster being smaller than a predetermined percentage.

20. A computing system for performing threat assessment by detecting interface services that are externally exposed with insufficient protection, the computing system comprising:
one or more processors; and
one or more memory having thereon computer-executable instructions that are structured such that, if executed by the one or more processors, the computing system is configured to:
identifying a group of interface services that have one or more common characteristics, the group of interface services being in a multi-cluster system that includes a plurality of clusters of machine nodes, each cluster running one or more applications, and each application including an interface service that exposes the corresponding application as a network service;
identifying the group of interface services as sensitive based on an amount of plurality the clusters that permit the interface services to be connected from outside the respective cluster;
for each of at least some of the plurality of interface services within the multi-cluster system including interface services of multiple clusters of the plurality of clusters, estimating that a corresponding interface service within a corresponding cluster is misconfigured so as to be improperly connectable external to the corresponding cluster, and sending notifications of the estimations to corresponding cluster management component of a particular clusters within which the corresponding interface service operates, the estimation being performed in response to the following determinations:
determining that the corresponding interface service also has the one or more common characteristics;
determining that the corresponding interface service is connectable outside the corresponding cluster; and
determining that a corresponding application that the corresponding interface service exposes as a network service does not require authentication.

* * * * *